(12) United States Patent
Sanchez et al.

(10) Patent No.: US 8,901,025 B2
(45) Date of Patent: Dec. 2, 2014

(54) CATALYST REGENERATION ZONE DIVIDED INTO SECTORS FOR REGENERATIVE CATALYTIC UNITS

(75) Inventors: Eric Sanchez, Saint Genis Laval (FR); Frederic Bazer-Bachi, Irigny (FR); Beatrice Fischer, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 114 days.

(21) Appl. No.: 13/636,406

(22) PCT Filed: Feb. 18, 2011

(86) PCT No.: PCT/FR2011/000103
§ 371 (c)(1),
(2), (4) Date: Dec. 3, 2012

(87) PCT Pub. No.: WO2011/117478
PCT Pub. Date: Sep. 29, 2011

(65) Prior Publication Data
US 2013/0072376 A1    Mar. 21, 2013

(30) Foreign Application Priority Data
Mar. 24, 2010   (FR) ...................................... 10 01161

(51) Int. Cl.
| | |
|---|---|
| *B01J 38/38* | (2006.01) |
| *B01J 38/44* | (2006.01) |
| *B01J 38/20* | (2006.01) |
| *B01J 38/32* | (2006.01) |
| *C10G 45/00* | (2006.01) |
| *C10G 45/58* | (2006.01) |
| *B01J 38/24* | (2006.01) |
| *C10G 11/00* | (2006.01) |
| *B01J 38/14* | (2006.01) |
| *B01J 38/34* | (2006.01) |
| *B01J 38/12* | (2006.01) |
| *C10G 11/18* | (2006.01) |
| *B01J 38/00* | (2006.01) |
| *C10G 35/00* | (2006.01) |
| *B01J 8/12* | (2006.01) |
| *B01J 38/02* | (2006.01) |

(52) U.S. Cl.
CPC ........ *B01J 38/38* (2013.01); *B01J 2208/00371* (2013.01); *B01J 2208/00504* (2013.01); *C10G 2300/70* (2013.01); *B01J 38/44* (2013.01); *B01J 38/20* (2013.01); *B01J 38/32* (2013.01); *C10G 45/00* (2013.01); *C10G 45/58* (2013.01); *B01J 38/24* (2013.01); *C10G 11/00* (2013.01); *C10G 2300/708* (2013.01); *B01J 38/14* (2013.01); *B01J 38/34* (2013.01); *B01J 38/12* (2013.01); *C10G 11/187* (2013.01); *B01J 38/00* (2013.01); *C10G 35/00* (2013.01); *B01J 8/125* (2013.01); *B01J 38/02* (2013.01); *Y10S 502/514* (2013.01); *Y10S 502/515* (2013.01); *Y10S 502/518* (2013.01)
USPC .............. 502/40; 502/514; 502/515; 502/518

(58) Field of Classification Search
USPC ............................ 502/40, 38, 514, 515, 518
See application file for complete search history.

(56) References Cited

U.S. PATENT DOCUMENTS

| | | | |
|---|---|---|---|
| 5,034,117 A | 7/1991 | De Bonneville et al. | |
| 6,103,652 A | 8/2000 | Brunet et al. | |
| 6,239,055 B1 | 5/2001 | Brunet et al. | |

FOREIGN PATENT DOCUMENTS

| | | |
|---|---|---|
| EP | 0 378 482 A1 | 7/1990 |
| EP | 0 872 277 A1 | 10/1998 |
| EP | 0 873 784 A1 | 10/1998 |
| FR | 2 934 963 A1 | 2/2010 |

OTHER PUBLICATIONS

International Search Report of PCT/FR2011/000103 (May 16, 2011).

*Primary Examiner* — Edward Johnson
(74) *Attorney, Agent, or Firm* — Millen, White, Zelano & Branigan, P.C.

(57) ABSTRACT

The present invention describes a combustion zone for a regenerative catalytic unit for the continuous regeneration of catalyst, said combustion zone having an annular shape and being divided into at least two combustion stages, each stage being divided into a number N of radial sectors, which are substantially equal, the catalyst flowing under gravity from one sector of the first combustion stage to the sector located in vertical alignment with the second combustion stage by means of drop legs, and the movement of the combustion gas being such that the combustion gas passes in succession through all of the sectors of the first combustion stage in any order, then all of the sectors of the second stage in any order.

10 Claims, 2 Drawing Sheets

CATALYST REGENERATION ZONE DIVIDED INTO SECTORS FOR REGENERATIVE CATALYTIC UNITS

FIELD OF THE INVENTION

The present invention relates to the field of units employing moving bed technology, which technology is found, for example, in units for the catalytic reforming of gasolines, in skeletal isomerization units, in metathesis units or in certain oligocracking or dehydrogenation units. This technology is characterized in that the catalytic bed follows a slow movement under gravity while the feed to be processed passes through the bed transversely or radially. To this end, the feed is generally introduced at the periphery of the gravitational flow catalytic bed, and the effluents from the reaction are collected in a central collector. Movement from the centre towards the periphery of the catalytic bed may also be envisaged.

In catalytic reforming units, the zone for regeneration of coked catalyst also employs moving bed techniques. This regeneration zone comprises several steps: combustion, oxychlorination, calcining and reduction of the catalyst, as described in patents FR 2 641 712, FR 2 761 910 and FR 2 922 786, for example.

More particularly, the present invention relates to a disposition of the combustion zone forming part of the regeneration zone, this combustion zone being divided into radial sectors, each sector being traversed by fuel gas along a specific pathway.

The advantages of this novel configuration over the prior art are better temperature control in said combustion zone and optimized consumption of fuel gas. The present invention also involves a simplification of the internal means of the combustion zone compared with the prior art.

EXAMINATION OF THE PRIOR ART

In regenerative units such as in the catalytic reforming of gasolines, regeneration of the coked catalyst after it has passed through the reaction zone is carried out continuously.

This is the case, for example, with intense catalytic reforming. In that type of unit, the catalyst is continuously extracted from the reactor or reactors, purged of the hydrogen that it contains and sent to a regeneration zone in which the coke is burned off in a controlled manner in order to re-establish the activity of the catalyst. Other operations are carried out in the regeneration zone, such as oxychlorination, calcining or reduction of the catalyst, but the present invention concerns the combustion zone in particular.

In this combustion zone, heating the catalyst too much should be avoided so as not to deteriorate catalytic performance and to avoid the formation of hot spots, which means that the operation has to be carried out with oxygen greatly diluted by inert gases (nitrogen and carbon dioxide, for example).

For this purpose, it is routine to recycle the combustion gases which are depleted in oxygen to act as a diluent by injecting a small quantity of air such that the oxygen content is sufficiently low to limit the exothermicity of the combustion reaction.

The skilled person knows to carry out the combustion in two steps, a first step at a low temperature without fuel for a controlled burn of the majority of the coke with a large but nevertheless limited temperature increase, followed by a second step at a higher temperature with an excess of fuel to terminate combustion, albeit accompanied by a relatively small increase in temperature due to the small quantity of coke remaining to be burned.

In the prior art, coke combustion is generally carried out in two thin radial beds disposed as a ring in which the catalyst moves from top to bottom at a slow rate under gravitational flow, the combustion gas moving horizontally through the radial bed, usually from the exterior of the bed towards the interior.

The gases removed from the various regeneration zones are recovered and treated so as to be able to be recycled again to the regeneration zone. In fact, in the prior art it is known to dilute oxygen with nitrogen. However, nitrogen is a very expensive gas. As an example, for a reforming unit with 40 tonnes of catalyst, if the regeneration gases are not re-used, approximately 6000 to 10000 Nm$^3$/h of nitrogen would have to be used.

By recycling the regeneration gases, the consumption of fresh nitrogen falls to approximately 80 Nm$^3$/h. In addition, the regeneration gas circuit includes various pieces of expensive equipment such as the recycling compressor, dryer, electric furnace or exchanger. Any reduction in the flow rate of the nitrogen thus has a major impact on the investment costs and the operating costs of the catalyst regeneration loop.

One of the aims of the present invention is to optimize the use of the flow of inert gas and thus to reduce the equipment size for the same quantity of regenerated catalyst by using a novel type of regeneration zone.

The closest prior art is constituted by the patent application published under number FR 2 934 963 A1, which describes a combustion zone comprising at least one annular coke combustion zone, said zone being divided into radial sectors, each stage comprising N radial sectors.

In the cited application, combustion is managed via the concept of molar composition with a constant oxygen content at the inlet to each sector. This results in a variation in the quantity of coke burned from one sector to another of the same stage, and thus to a possible lack of homogeneity of the quality of combustion in the various sectors.

In the present invention, the molar oxygen flow rate is kept constant over all of the sectors of a stage so that the quantity of burned coke is the same over all of the sectors of a stage. The improvement in the homogeneity of combustion over all of the sectors constituting a stage thus ensures that the catalytic performance is optimized, and this is necessary for obtaining the high octane numbers which are sought, for example in regenerative reforming units.

BRIEF DESCRIPTION OF THE INVENTION

Figure 1:
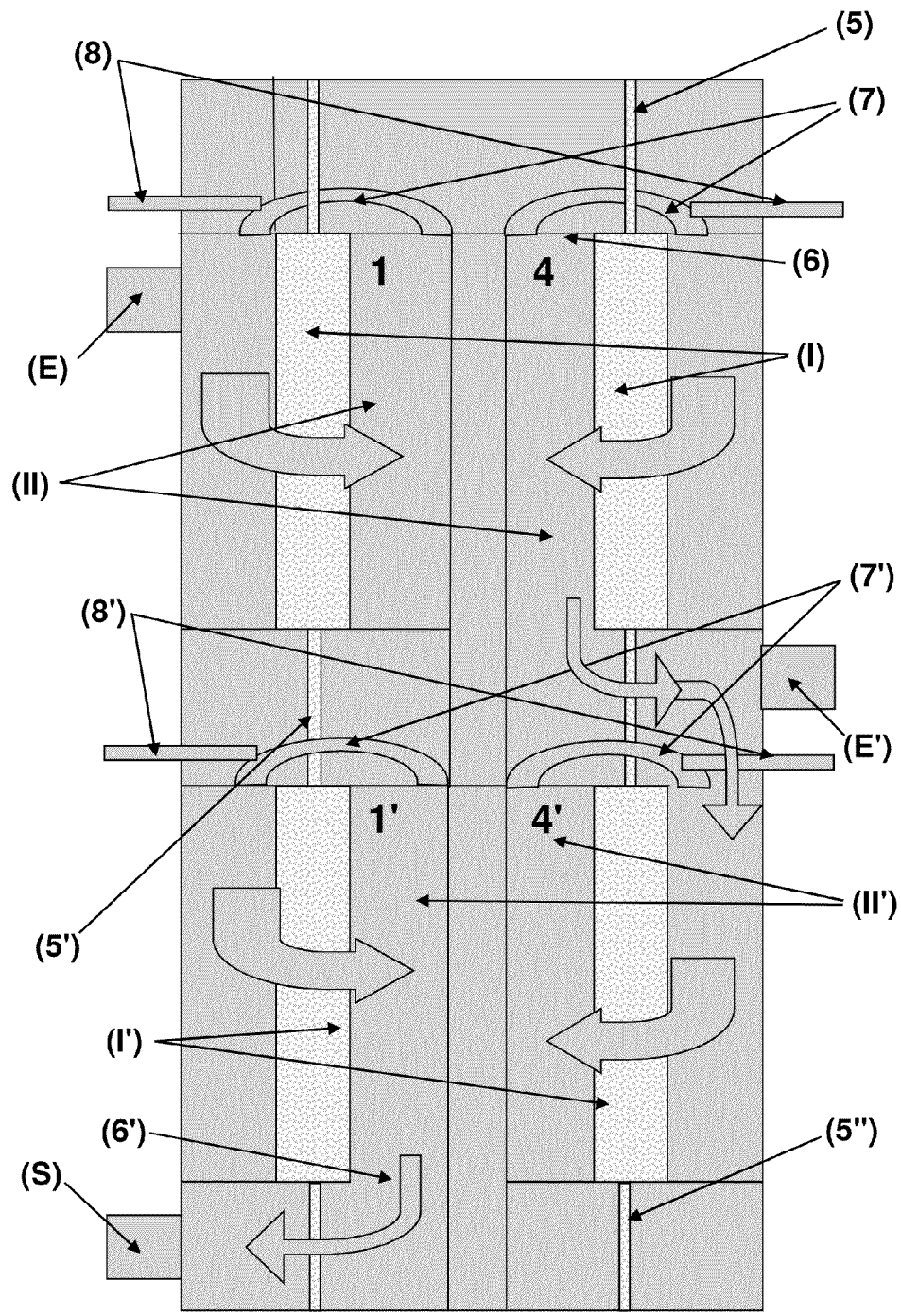
FIG. 1 is a diagrammatic sectional view of a combustion zone in accordance with the invention with more than 2 sectors per stage, showing the fuel gas circuit.

The present invention describes a process for the regeneration of a coked catalyst from a reaction zone, the catalyst moving in the regeneration zone as a moving bed. The term "moving bed" means that the catalyst moves under gravitational flow, the gas for regenerating said catalyst in the regeneration zone moving in a direction substantially perpendicular to that of the flow of the catalyst.

More precisely, the present invention consists of a process for the regeneration of a coked catalyst from a reaction zone which comprises at least one zone for combustion of the coke deposited on the catalyst.

The regeneration process of the present invention may be applied to units known as regenerative units in which the catalyst coked during the reaction has to be continuously regenerated. The catalyst regeneration process generally consists in an oxychlorination step, a calcining step followed by a catalyst reduction step. The regenerated catalyst is reintroduced into the reaction zone. The steps downstream of the combustion step do not form part of the present invention which is entirely compatible with any embodiment of said downstream steps.

Thus, the present invention concerns the step for combustion in the regeneration zone, hereinafter termed the combustion zone.

The combustion zone of the present invention is a two-stage zone in which the catalyst moves as a moving bed, i.e. under gravitational flow, and in which the fuel gas passes through the bed of catalyst in a radial manner, preferably from the outer periphery of the bed to its inner periphery. The bed of catalyst has an annular shape and is divided into a certain number of radial sectors.

In order to understand the gas movement circuit, the sectors of the first combustion stage are numbered 1 to N, and the sectors of the second stage are numbered from 1' to N'.

A sector i of the first stage and the sector i' of the second stage are approximately vertically aligned with each other, and the number of sectors of the first stage is equal to the number of sectors of the second stage. The sectors i and i', in vertical alignment with each other, are termed "corresponding" sectors.

The combustion gas movement consists of passing through all of the sectors of the first stage in any order, then through all of the sectors of the second stage in any order.

As an example, in a configuration where each stage is divided into 4 sectors, one possible circuit movement of the present invention is the circuit 1,2,3,4,1',2',3',4'. Another possible circuit is the circuit 1,2,3,4,4',3',2',1' which ensures that the fuel gas passes between the two combustion stages.

It is also possible to envisage a circuit of the type 1,3,4,2, 2',4',3',1'. In fact, any circuit passing through the sectors of the first stage in any order, then the sectors of the second stage, also in any order, falls within the scope of the present invention.

Another important characteristic of the present invention which distinguishes it from the prior art is the fact that each combustion stage operates with a constant molar flow rate of oxygen.

More precisely, each sector of a given combustion stage receives a fuel gas at its inlet such that the molar oxygen flow rate is always the same.

Thus, the flow rate of burned coke in each sector of the same stage is the same. The homogeneity of the thermal gradient in the various sectors of the same combustion stage thus guarantees the quality of regeneration of the catalyst.

Since the flow rate of the fuel gas changes from one sector to the next, this means that the oxygen content is not constant from one sector to the next of the same stage. This remains true for the sectors of the second combustion stage.

At the first combustion stage, the quantity of oxygen introduced onto each sector corresponds to combustion of a quantity of coke in the range 50% to 90% of the total coke deposited on the catalyst, preferably in the range 60% to 80%, and at the second stage, the quantity of oxygen introduced corresponds to total combustion of the residual coke.

In practice, the fuel gas is introduced onto all of the sectors of the second stage in excess, this excess possibly being quantified by an excess of oxygen at the outlet from the sector in the range 0.1% to 0.5%, preferably in the range 0.2% to 0.4% of oxygen.

Preferably, the number of combustion stages is two, and the number of sectors per stage is in the range 2 to 8, preferably in the range 2 to 4.

Make-ups of a cooling gas are carried out at the inlet to each sector so as to maintain the temperature at the inlet within predetermined limits, generally 460° C. to 480° C. for the sectors of the first stage, and 470° C. to 490° C. for the sectors of the second stage.

This cooling gas is generally the fuel gas taken from the outlet from the compressor of the recycle loop, and thus before it passes through the series of exchanger and/or reheating furnaces forming part of the traditional circuit for regenerative reforming type units. The make-ups of cooling gas are generally made by means of specific lines which open into the lines that are used to connect the outlet from one sector to the inlet to the neighbouring sector. In this same line, cooling gas is mixed with a flow of fuel gas in order to provide a make-up of fuel between the various sectors of the same stage. The fuel gas may in general contain in the range 4% to 21% of oxygen.

In a variation, the combustion zone of the present invention consists of no longer cooling the fuel gas by make-ups of cooling gas, but by using heat exchangers that can further substantially reduce the total flow rate of fuel gas necessary for regeneration of the catalyst.

In another variation, the process consists of simplifying the circuit for the distribution of fuel gas by adopting an alternating configuration between the various sectors.

The term "alternating configuration" means a configuration in which the fuel gas moves from the exterior to the interior over a given sector, and then moves from the interior to the exterior over the following sector, and so on. The term "following sector" of a given sector is applied to the geometrically neighbouring sector which is traversed by the fuel gas.

DETAILED DESCRIPTION OF THE INVENTION

The present invention may be described as a combustion zone for regenerative units, for example for regenerative reforming or for skeletal isomerization, in which the catalyst flows in moving bed mode (i.e. under gravitational flow) from a first stage to a second stage, each stage being divided into a certain number of radial sectors, and the fuel gas moves in a circuit characterized in that the fuel gas passes in succession through all of the sectors of the first stage then in succession through all of the sectors of a second stage.

In the case of a regenerative reforming unit or any other processes necessitating continuous regeneration of catalyst, in addition to the combustion zone which carries out combustion of coke deposited on the catalyst, the catalyst regeneration zone comprises other zones in which oxychlorination, calcining and reduction of the catalyst are carried out. These other zones will not be described in the present text since they are in their prior art configurations.

FIG. 1 is a visualization of the structure of the regeneration zone of the invention.

We will describe below the circuit for the catalyst in sector 4 and that of the fuel gas in sector 1.

The numbering of the sectors of the first combustion stage is: 1,2,3,4.

The numbering of the sectors of the second stage, facing those of the first combustion stage, is: 1',2',3', and 4'. These sectors are separated by walls (9). The sectors which are vertically aligned with respect to each other are 1 and 1', 2 and 2', 3 and 3', 4 and 4'; these are termed "corresponding" sectors.

The catalyst is introduced into the upper vessel (I) via the leg (5) and moves into the chamber (I) of sector 4 under gravitational flow, then it passes through the leg (5') to be introduced into the lower chamber (I') of the sector 4'. It leaves the sector 4' via the dropper (5").

The fuel gas is introduced into the vessel (I) via the peripheral line (E) communicating with the sector 1, a baffle (6) obliging the gas to move towards the outer ring of this zone. The gas passes radially through the catalytic bed (I) from the outer periphery towards the inner periphery of the catalytic bed, and is found in the annular space (II).

Figure 2:
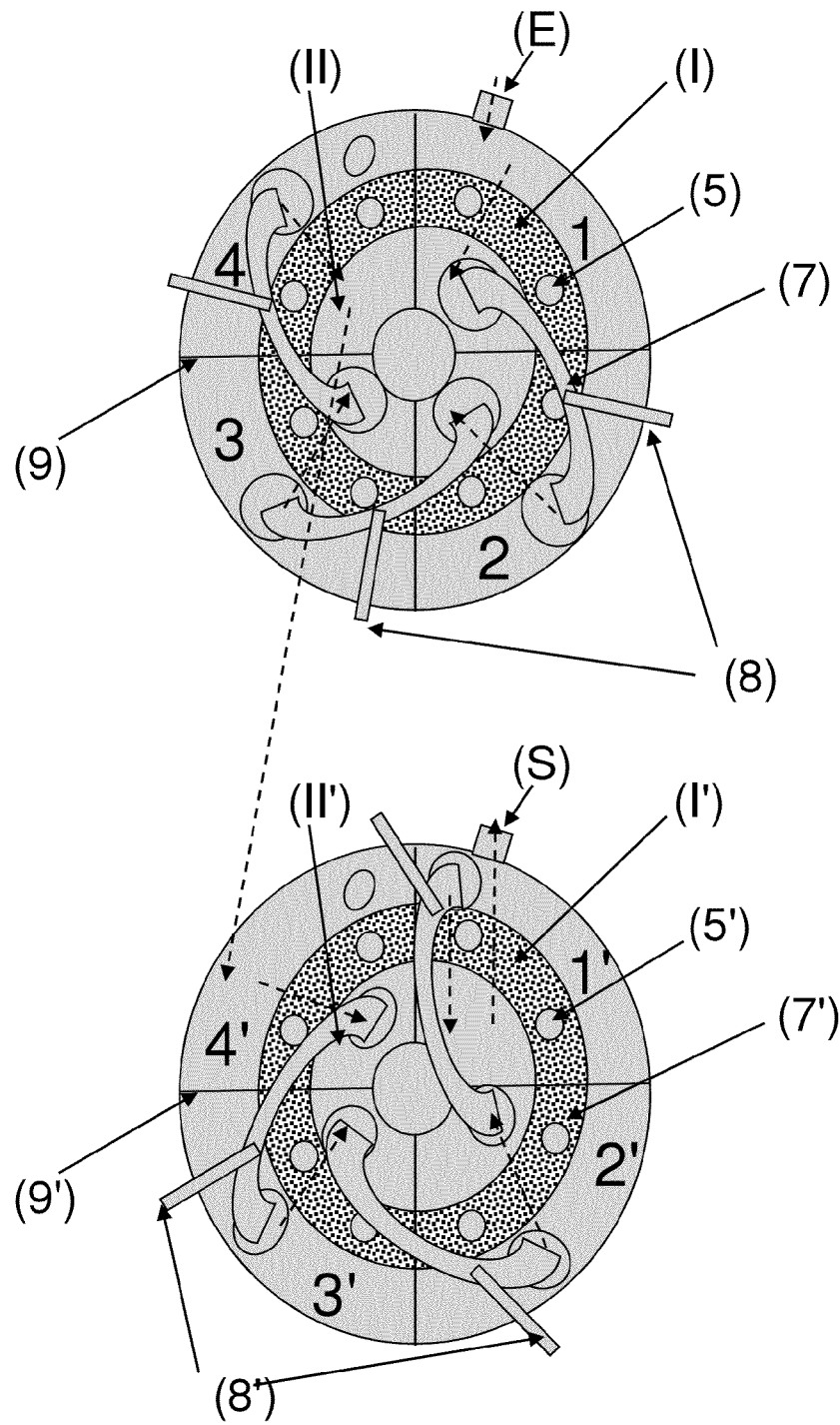
FIG. 2 is a diagrammatic top view of the combustion zone of the invention, showing 4 sectors per stage.

This annular space (II) can be used to return the fuel gas via the line (7) to the inlet to the following sector of the same annular space, i.e. sector 2, which is shown in FIG. 2. The term "following sector" after a given sector is used for the geometrically neighbouring sector which is traversed by the fuel gas in the direction of flow of said fuel gas.

The gas circuit in sector 2 is the same as that described for sector 1.

From the outlet from sector 2, the fuel gas passes to the inlet to sector 3 then from the outlet from sector 3, the fuel gas passes to the inlet to sector 4.

From the outlet from sector 4, the fuel gas is introduced into the inlet to sector 4' belonging to the second combustion stage located below said sector 4.

The fuel gas continues its circuit in the second combustion stage: outlet sector 4' to inlet sector 3'; outlet sector 3' to inlet sector 2'; outlet sector 2' to inlet sector 1', and outlet sector 1' to the outside via the line (S).

The cooling gas/fuel gas make-up mixture is introduced via lines (8) which are connected to lines (7).

The fuel gas leaves the last sector of the second combustion stage via the evacuation line (S).

Thus, the present invention may be defined as a process for the regeneration of a coked catalyst moving in moving bed mode, said catalyst being coked at the end of the reaction zone.

The regeneration process of the invention comprises at least one zone for the combustion of coke deposited on the catalyst, said combustion zone having an annular shape and being divided into at least two combustion stages, each combustion stage being divided into a number N of radial sectors, which are substantially equal.

The catalyst flows under gravity from one sector of the first combustion stage to the sector located in vertical alignment of the second combustion stage by means of drop legs, and the movement of the combustion gas is such that the combustion gas passes in succession through all of the sectors of the first combustion stage in any order, then all of the sectors of the second combustion stage in any order.

The molar flow rate of the fuel gas has the same first value for all of the sectors of the first stage, said first value allowing combustion of a quantity of coke in the range 50% to 90% of the total coke deposited on the catalyst, preferably in the range 60% to 80%.

The molar flow rate of fuel has the same second value, distinct from the preceding value, for all of the sectors of the second combustion stage, said second value allowing complete combustion of residual coke with an excess of oxygen in the fuel gas in the range 0.1% to 0.5% of oxygen, preferably in the range 0.2% to 0.4% of oxygen.

The inlet temperature for all of the sectors of the first combustion stage is generally in the range 460° C. to 490° C., and the inlet temperature of all of the sectors of the second combustion stage is generally in the range 470° C. to 510° C.

The number of sectors in each combustion stage is generally in the range 2 to 8, preferably in the range 2 to 4.

In a first variation of the present invention, the number of sectors being 4 at each combustion stage, and numbering the sectors of the first stage 1,2,3,4 and the sectors corresponding to the second stage 1',2',3',4'; the fuel gas follows the circuit 1,2,3,4,4',3',2',1'.

In a second variation of the present invention, the number of sectors being 2 at each combustion stage, and numbering the sectors of the first stage 1, 2 and the sectors corresponding to the second stage 1',2', the fuel gas follows the circuit 1,2,2',1'.

In a third variation of the present invention, the fuel gas passes through each sector from the outer periphery towards the inner periphery of each of the sectors.

In another variation, the fuel gas passes through each sector from the inner periphery to the outer periphery of each of the sectors.

Finally, in another variation, the fuel gas moves from the outer periphery towards the inner periphery over a given sector, and from the inner periphery towards the outer periphery over the sector neighbouring the sector under consideration.

In general, the fuel gas is air with an oxygen content in the range 4% to 21%.

In a variation of the present invention, the fuel gas may be cooled at the inlet to each sector by means of a set of exchangers.

The catalyst regeneration process of the present invention may be applied to all units that use a catalyst necessitating continuous regeneration and in which the catalyst moves in moving bed mode. The following units may be cited as examples:

regenerative reforming of gasolines, skeletal isomerization, metathesis, oligocracking, dehydrogenation.

COMPARATIVE EXAMPLE

The example below compares the prior art configuration as represented by published application FR 2 934 963 A1 with the configuration of the present invention.

The regeneration zone was divided into 2 stages, each stage comprising 4 sectors denoted 1,2,3,4 for the first stage and 1',2',3',4' for the second stage.

Two types of fuel gas circulation were compared:

1,1', 2,2', 3,3', 4,4' using the geometrical configuration of the prior art;

1,2,3,4,4',3',2',1' in accordance with the invention.

The conditions which are common to the two configurations were as follows:

120 kg/h of coke to be burned (i.e. 1800 kg/h of coked catalyst);

2 combustion stages;

4 sectors per stage;

mean temperature at inlet for sectors 1 to 4 of the first combustion stage: (475° C.);

mean temperature at inlet for sectors 1 to 4 of the second combustion stage: (480° C.).

In the prior art, the gas flow rates were managed by maintaining a constant oxygen content at the inlet to each section, which caused relatively large discrepancies in the quantity of burned coke and thus in the outlet temperatures from the sectors of a given stage.

In the present invention, the fuel gas flow rates were managed by maintaining the oxygen flow rate constant at a certain value over all of the sectors of the first stage then at another value over all of the stages of the second stage, i.e.:

molar flow of oxygen arriving at sectors 1 to 4 of the first combustion stage adjusted to burn ⅔ of coke;

molar flow of oxygen arriving at sectors 1' to 4' of the second combustion stage adjusted to burn the remaining coke, with an excess of 30% with respect to the stoichiometric quantity of oxygen.

It will be seen from Table 1 below that in accordance with the invention, the outlet temperatures for the sectors of the first stage were located in the range 530° C. to 521° C. and in the range 506° C. to 501° C. for the sectors of the second stage. In the prior art, however, (see Table 2), the dispersion of the temperatures at the outlet from each sector was much more pronounced.

It will also be seen that in accordance with the invention, the percentage of burned coke was fairly constant over all of the sectors of a given stage (66.6% at the first stage and 100% at the second stage), while it was very different from one sector to another in the prior art.

TABLE 1

(in accordance with the invention)

| | Stage 1/sectors | | | |
|---|---|---|---|---|
| | 1 | 2 | 3 | 4 |
| Coke conversion (%) | 66.6 | 66.6 | 66.6 | 66.6 |
| Flow rate (t/h) | 7.4 | 8.7 | 10.0 | 11.3 |
| $\%_{mol} O_2$ | 0.80 | 0.68 | 0.59 | 0.52 |
| $T_{inlet}$ (° C.) | 470 | 473 | 475 | 477 |
| $T_{outlet}$ (° C.) | 530 | 529 | 525 | 521 |

| | Stage 2/sectors | | | |
|---|---|---|---|---|
| | 1' | 2' | 3' | 4' |
| Coke conversion (%) | 100 | 100 | 100 | 100 |
| Flow rate (t/h) | 12.6 | 13.6 | 14.6 | 15.6 |
| $\%_{mol} O_2$ | 0.55 | 0.51 | 0.47 | 0.44 |
| $T_{inlet}$ (° C.) | 480 | 480 | 480 | 480 |
| $T_{outlet}$ (° C.) | 506 | 504 | 502 | 501 |

TABLE 2

(prior art)

| | Stage 1/sectors | | | |
|---|---|---|---|---|
| | 1 | 2 | 3 | 4 |
| Coke conversion (%) | 66.6 | 87.6 | 100 | 100 |
| Flow rate (t/h) | 7.4 | 9.7 | 11.4 | 12.7 |
| $\%_{mol} O_2$ | 0.8 | 0.8 | 0.8 | 0.8 |
| $T_{inlet}$ (° C.) | 475 | 475 | 475 | 475 |
| $T_{outlet}$ (° C.) | 536 | 522 | 516 | 511 |

| | Stage 2/sectors | | | |
|---|---|---|---|---|
| | 1' | 2' | 3' | 4' |
| Coke conversion (%) | 100 | 100 | 100 | 100 |
| Flow rate (t/h) | 8.6 | 10.9 | 12.6 | 13.9 |
| $\%_{mol} O_2$ | 0.55 | 0.55 | 0.55 | 0.55 |
| $T_{inlet}$ (° C.) | 480 | 480 | 480 | 480 |
| $T_{outlet}$ (° C.) | 518 | 491 | 480 | 480 |

The invention claimed is:

1. A process for the regeneration of a coked catalyst moving in moving bed mode, comprising at least one zone for the combustion of coke deposited on the catalyst, said combustion zone having an annular shape and being divided into at least two combustion stages, each stage being divided into a number N of radial sectors, which are substantially equal, the catalyst flowing under gravity from one sector of the first combustion stage to the sector in vertical alignment of the second combustion stage by drop legs, and the movement of combustion gas being substantially perpendicular to that of the catalyst, and such that the combustion gas passes in succession through all of the sectors of the first combustion stage in any order, then through all of the sectors of the second combustion stage in any order, the molar flow rate of fuel having the same first value for all of the sectors of the first stage, said first value allowing the combustion of a quantity of coke in the range 50% to 90% of the total coke deposited on the catalyst and a second value, distinct from the preceding value, for all of the sectors of the second combustion stage, said second value allowing complete combustion of residual coke with an excess of oxygen in the fuel gas in the range 0.1% to 0.5%, the inlet temperature for all of the sectors of the first stage of the combustion zone being in the range 460° C. to 490° C. and the inlet temperature for all of the sectors of the second stage of the combustion zone being in the range 470° C. to 510° C.

2. A process for the regeneration of a coked catalyst according to claim 1, in which combustion of the coke at the first stage of the combustion zone is in the range 60% to 80% of the total coke deposited on the catalyst, and the excess of oxygen in the fuel gas at the second stage of the combustion zone is in the range 0.2% to 0.4%.

3. A process for the regeneration of a coked catalyst according to claim 1, in which the number of sectors in each stage of the combustion zone is in the range 2 to 8.

4. A process for the regeneration of a coked catalyst according to claim 1, in which the number of sectors is 4 at each stage of the combustion zone, and by numbering the sectors of the first stage 1,2,3,4 and the facing sectors of the second stage 1',2',3',4', the fuel gas follows the circuit 1,2,3,4,4',3',2', 1'.

5. A process for the regeneration of a coked catalyst according to claim 1, in which the number of sectors is 2 at each stage of the combustion zone, and by numbering the sectors of the first stage 1, 2 and the facing sectors of the second stage 1',2', the fuel gas follows the circuit 1,2,2',1'.

6. A process for the regeneration of a coked catalyst according to claim 1, in which the fuel gas moves from the exterior towards the interior over a given sector of the combustion zone and from the interior towards the exterior over the sector neighboring said given sector.

7. A process for the regeneration of a coked catalyst according to claim 1, in which the fuel gas is air with an oxygen content in the range 4% to 21%.

8. A process for the regeneration of a coked catalyst according to claim 1, in which the fuel gas is cooled at the inlet to each sector of the combustion zone by an exchanger device.

9. In a process for regenerative reforming, skeletal isomerization, metathesis, oligocracking or dehydrogenation, in which process a catalyst is regenerated, the improvement wherein the regeneration is a process according to claim 1.

10. A process for the regeneration of a coked catalyst moving in moving bed mode, comprising at least one zone for the combustion of coke deposited on the catalyst, said combustion zone having an annular shape and being divided into at least two combustion stages, each stage being divided into a number N of radial sectors, wherein N is in the range of 2 to 4, which are substantially equal, the catalyst flowing under gravity from one sector of the first combustion stage to the sector in vertical alignment of the second combustion stage by drop legs, and the movement of combustion gas being substantially perpendicular to that of the catalyst, and such that the combustion gas passes in succession through all of the sectors of the first combustion stage, then through all of the sectors of the second combustion stage in the following order, in which the number of sectors is 4 at each stage of the combustion zone, and by numbering the sectors of the first stage 1,2,3,4 and the facing sectors of the second stage 1',2',3',4', the fuel gas follows the circuit 1,2,3,4, 4',3',2',1', or in which the number of sectors is 2 at each stage of the combustion zone, and by numbering the sectors of the first stage 1, 2 and the facing sectors of the second stage 1',2', the fuel gas follows the circuit 1,2,2',1', the molar flow rate of fuel having the same first value for all of the sectors of the first stage, said first value allowing the combustion of a quantity of coke in the range 50% to 90% of the total coke deposited on the catalyst and a second value, distinct from the preceding value, for all of the sectors of the second combustion stage, said second value allowing complete combustion of residual coke with an excess of oxygen in the fuel gas in the range 0.1% to 0.5%, the inlet temperature for all of the sectors of the first stage of the combustion zone being in the range 460° C. to 490° C. and the inlet temperature for all of the sectors of the second stage of the combustion zone being in the range 470° C. to 510° C.

* * * * *